United States Patent [19]

Damer et al.

[11] 4,012,233
[45] Mar. 15, 1977

[54] CONVEYOR FOR CONTAINERS FOR CARRYING OBJECTS OF GLASS OR SIMILAR MATERIALS, WHICH OBJECTS ARE TO BE HARDENED CHEMICALLY BY SURFACE TREATMENT

[75] Inventors: Harald Damer, Weimar; Kurt Kessler, Jena; Ulrich Kühne, Torgau; Kurt Schneider; Karl Unbehaun, both of Jena; Manfred Wilke, Jena-Lobeda; Johannes Franke, Jena, all of Germany

[73] Assignee: VVB Haushalts-und Verpackungsglas, Jena, Germany

[22] Filed: July 18, 1975

[21] Appl. No.: 597,110

[30] Foreign Application Priority Data

July 31, 1974 Germany .............................. 180213

[52] U.S. Cl. ................................ 134/75; 134/126; 134/134; 134/166 R
[51] Int. Cl.² .......................................... B08B 3/08
[58] Field of Search ............. 134/75, 124, 126–127, 134/133–134, 166 R, 170

[56] References Cited

UNITED STATES PATENTS

| 768,486 | 8/1904 | Schreiber, Jr. ................... 134/75 X |
| 1,656,528 | 1/1928 | Millard ........................... 134/124 X |
| 2,141,362 | 12/1938 | Platt et al. ...................... 134/126 X |
| 2,368,233 | 1/1945 | Lyon ............................... 134/75 X |

Primary Examiner—Robert L. Bleutge
Attorney, Agent, or Firm—Nolte and Nolte

[57] ABSTRACT

In combination with at least one vessel for containing a molten salt for chemically hardening or otherwise surface treating objects of glass or similar materials, a conveyor for transporting the objects through a treatment zone comprising at least one vessel for containing a molten salt, the conveyor comprising a plurality of driven sprocket wheels, a sprocket chain trained over the sprocket wheels, the objects so mounted on the sprocket chain as not to permit the objects substantially to change their orientation with a change in the orientation of the sprocket chain, the sprocket wheels and sprocket chain being so arranged that the objects are first carried downwardly into the vessel and are then carried upwardly out of the vessel with the opening of any depression or cavity in each of the objects facing downwardly during the upward movement.

3 Claims, 2 Drawing Figures

CONVEYOR FOR CONTAINERS FOR CARRYING OBJECTS OF GLASS OR SIMILAR MATERIALS, WHICH OBJECTS ARE TO BE HARDENED CHEMICALLY BY SURFACE TREATMENT

The present invention relates to a conveyor for containers to carry objects made of glass or similar materials, which objects are to be hardened chemically by surface treatment in molten salt baths heated to high temperatures in a multi-tank system or are to be otherwise surface treated by being immersed in a liquid substance in a tank.

Various transporting and conveying apparatuses for containers to carry glass objects to be hardened, which apparatuses are designed in accordance with whether the surface treatment process is conducted in a single or multiple tank system and which run the objects successively through the various zones of the process such as the loading, heating, hardening, cooling, washing, drying and unloading zones, are known. Known transport systems consist, for example, of conveyor belts, link belts, link chains or tracks.

In conjunction with the known method according to West German Offenlegungsschrift No. 1,771,269 for the chemical hardening of glass objects, there is described a machine containing an endless conveying device for transporting glass objects to be hardened, in particular soda-lime glass discs, successively from a loading station through a salt bath tank, a furnace and a cooling chamber to an unloading station. The speed of this conveyor is adjusted so that each glass disc is coated on each of its surfaces by a salt layer of uniform thickness as it passes through the bath. However, this transporting device is suited only for transporting single objects in a single tank system.

In German Democratic Republic Pat. No. 69,678, there is disclosed an endless conveyor belt, travelling counterclockwise, on which are disposed several racks to receive the glass discs to be hardened and which moves into and out of the salt bath tank in such a manner that the temperature along the path described decreases in the travel direction of the conveyor belt. Due to reorientation of the conveyor belt by conveyor guide rollers, it passes successively through the preheating zone, the hardening bath and the cooling zone.

Furthermore, there is known from German Democratic Republic Pat. No. 89,217 a transporting apparatus consisting of several conveyor carts, arranged equidistant from each other, connected to each other by detachable bars and running on rails. The apparatus is mounted above a furnace containing a salt bath multitank system and covers the entire length of the system. In this arrangement, however, each conveyor cart is equipped with a toothed rack driven by an electric motor and running in a slot in the furnace cover, there being detachably mounted to the toothed rack end projecting into the furnace a carrier rack holding the glass objects to be solidified. The design of this conveyor is such that the carrier racks, in a conversion zone of the furnace, can be lowered into salt bath tanks after each stepwise motion and can be lowered into and raised from the salt bath tanks according to a predetermined schedule.

These known conveying and transporting devices having containers to carry the glass objects to be hardened, the containers being disposed on rails or toothed racks which can be lowered by means of the conveying device, have the disadvantage that because of their stepwise forward motion from one treatment station to the next and because of their being lowered into and lifted out of the various salt baths, the entire line can be operated only in a discontinuous mode. The conveyors are controlled in stepwise feeding motion so that there is no continuous passing of the containers carrying the glass objects to be hardened through the various salt baths and successively through the different zones.

Another disadvantage of the conveying devices according to West German Offenlegungsschrift No. 1,771,269 and German Democratic Republic Pat. No. 69,678 is that the hardening of container glass is not possible with them. The conveying systems described, by their design, cause the salt baths to be ladled out by the glass objects, and the wetting of the entire container glass surface by the salt bath is poor.

It is an object of the invention to provide a conveyor for containers to carry objects made of glass or similar materials to be chemically hardened or otherwise modified in their chemical and/or physical properties, which conveyor, by its construction, arrangement and control, assures the transportation through baths for the modification of the chemical and/or physical properties of said objects without the disadvantages of the prior art conveying means.

It is a further object of the invention to provide a transport system for an apparatus for the modification of the chemical and/or physical properties of objects made of glass or similar materials which operates both continuously and discontinuously and which includes an endless conveyor which performs a motion so that the surfaces of the objects to be modified are completely wetted by salt baths while the ladling out of said baths by the objects is avoided, and which is designed so as to be adaptable to special technological conditions without time loss and while operating continuously.

Other objects and advantages of the invention will be obvious to those skilled in the art from the following description of the invention.

According to the invention, the conveyor for containers to carry objects made of glass or similar materials to be chemically hardened or otherwise modified by surface treatment, the conveyor consisting of a sprocket chain with a speed-controlled drive mechanism, has the features that, while it carries the objects in sequence through the various treatment zones due to the guidance and reorientation of the sprocket chain by sprocket wheels positively driven by a central drive mechanism, it is arranged so that a change in the travel direction of the sprocket chain by about 180° originates during its travel from a downward to an upward direction as well as by about 180° during its travel from an upward to a downward direction, and that dips in the sprocket chain can be adjusted to the same or different lengths by means of clutches on the drive shafts or the dips can be likewise eliminated completely in the treatment zone. The containers to carry the glass objects are mounted in the sprocket chain so that they cannot rotate about their own axis. This assures reliable wetting of the entire surfaces of the glass objects to be hardened without the inclusion of air pockets and prevents ladling of the salt bath out of its tank. The open side of any depression or cavity in the objects faces downwardly during the upward movement of the objects out of the tank.

Due to the possibility of being able to engage or disengage from the central drive mechanism single or plural drive shafts with sprocket wheels by means of clutching devices, the sprocket chain can be changed in its dips in the multitank system so that all dips can be varied or completely eliminated. This makes the phases of the process within a given system variable within a wide range.

In this arrangement, the sprocket chain passes through the treatment zones for the hardening of the glass objects at a uniform, yet variable, rate of speed. If the treatment path for the objects to be hardened is changed, as described above, the change in the chain dips caused thereby in the treatment zones can be compensated for by changing the chain dips in the loading and unloading zone.

The loading and unloading of the containers for carrying the glass objects on the sprocket chain continuously moving at a uniform rate of speed takes place in the loading and unloading zones. During this motion of the sprocket chain through the loading and unloading zones, the glass objects, placed in pallets or boxes, must be put in place on the moving chain system constantly, an operation which can be demanding on the operator and not as safe as desired. For this reason, the conveyor also permits the mechanization of the loading and unloading operation through an endless bucket conveyor system or through raising and lowering platforms or similar means synchronized with the sprocket chain. This requires a connecton of these devices with the central drive mechanism through chains and appropriate drives. This can expediently be accomplished by means of drive cams which can be engaged and disengaged again at certain stroke lengths in the vertical reciprocation of a loading and unloading platform.

The continuous operating mode of the sprocket chain can be replaced by a discontinuous one in that the central drive mechanism drives the sprocket chain stepwise through a time-cyling device. This makes it possible to unload and reload the containers for carrying the glass objects from stationary work platforms while the sprocket chain is not moving. Having the sprocket chain move discontinuously in the loading and unloading zones can also be accomplished with uniformly continuous sprocket chain motion in the treatment zones by means of driving elements directly coupled with the central drive mechanism, such as push rod transmissions, Maltese cross transmissions or similar transmission systems or, preferably, by means of a separate drive mechanism.

In the latter case, the discontinuous drive is adjusted through a control system so that the mean speed of the intermittent motion of the sprocket chain in the area of the loading and unloading zones equals the speed of the uniform sprocket chain motion in the treatment zones.

The discontinuous drive may also be controlled, either by hand or automatically, so that the containers to be emptied are moved out of a reserve dip, acting as a storage component in the system, between the outlet from the treatment system and its emptying point and, on the other hand, the containers to be loaded are introduced into the treatment system through a reserve dip, acting as a storage component in the system between the loading point and the inlet to the treatment system. This provides the option of maintaining the continuous motion of the sprocket chain in the treatment zones in case of breakdowns or a change in the assortment. For controlling the storage capacity, limit switches for maximum and minimum chain dip are provided.

By reversing the direction of motion of the respective drives, the conveyor can also pass through the treatment zone in the opposite direction. In addition, the conveyor can also be used in single tank systems.

The invention now will be further described by reference to a specific, preferred embodiment as illustrated in the drawings, in which.

Figure 1:
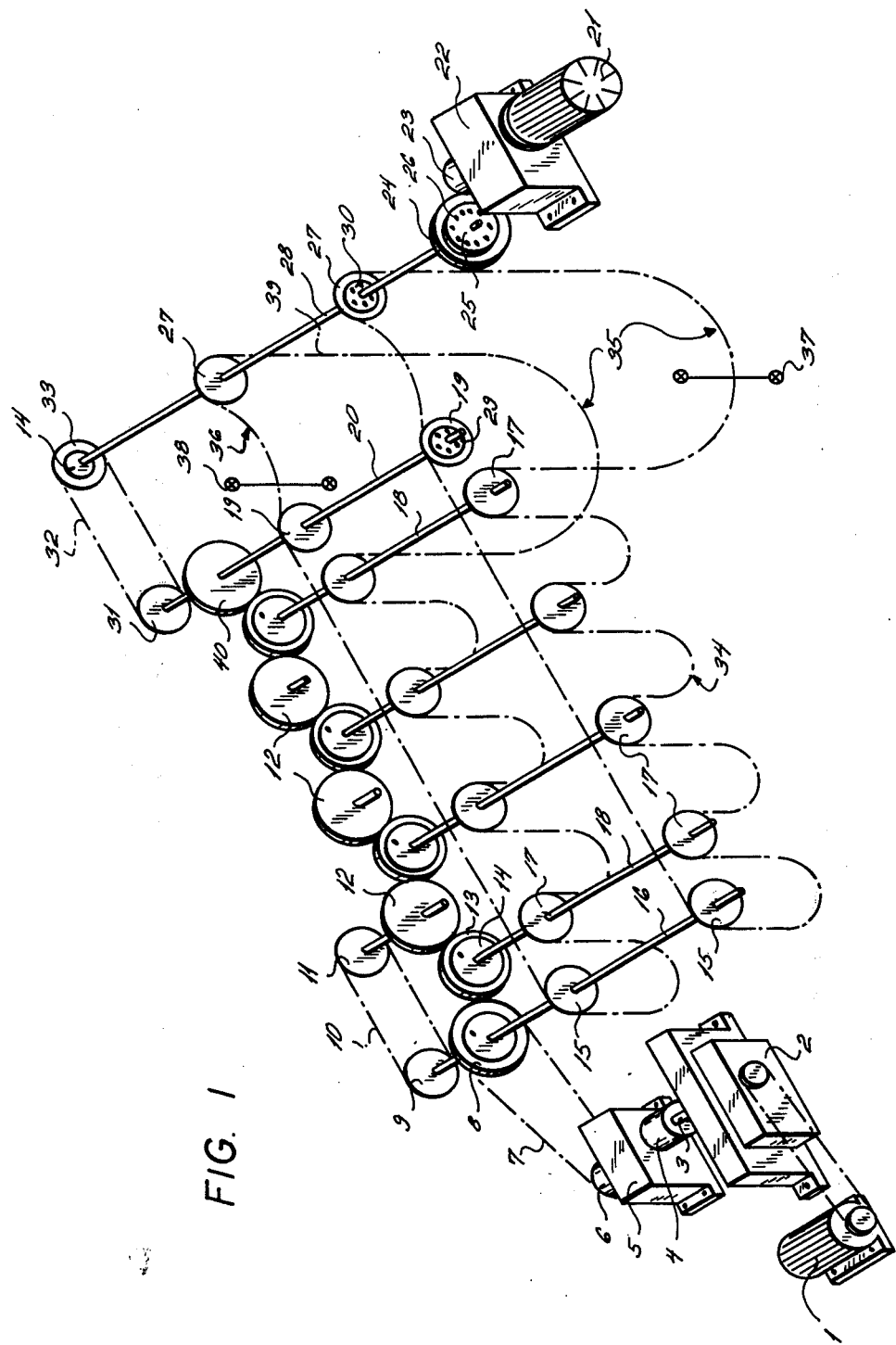
FIG. 1 is a perspective view of the conveyor according to the invention.
Figure 2:
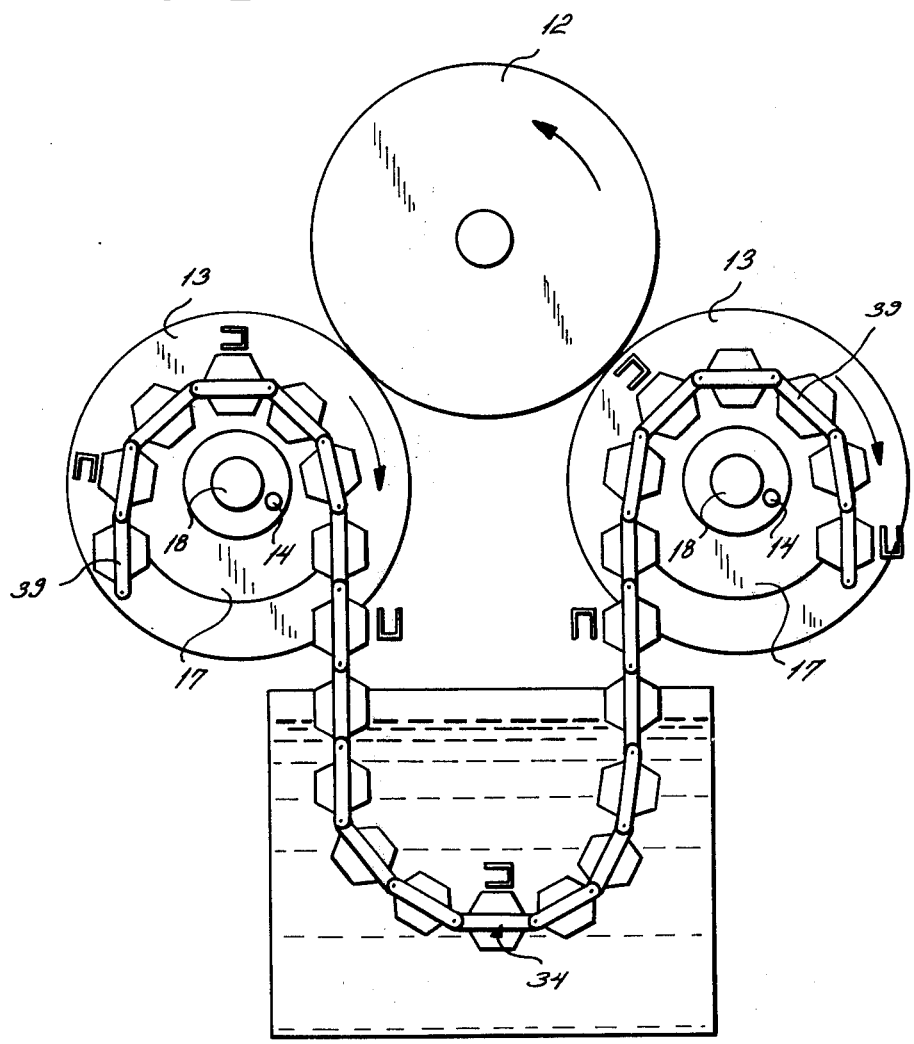
FIG. 2 is a side elevation of the conveyor as it is transporting schematically illustrated glass objects into, through and out of a salt bath tank.

The conveyor is constructed from known elements of the drive, conveying, control and machine building technologies which are combined according to the invention. The conveyor consists of a sprocket chain 39 which may be of single or plural strand design. The sprocket chain 39 supports the containers for carrying the glass objects and is guided, reoriented and moved with uniform or differently adjusted sagging portions 34 through a multitank system by means of sprocket wheels 15, 17, 19, 27 mounted on drive shafts 16, 18, 28 and driven in automatic synchronism by a main drive mechanism.

The main drive mechanism of the conveyor consists of a motor 1, speed-controlled transmission 2, slip clutch 3 with signal switch 4, speed reduction gear 5 and chain drive 6, 7, 8. The sprocket wheel 8 drives through a clutch 14, a drive shaft 16 with sprocket wheels 15, on the one hand, and, through a chain drive 9, 10, 11, idler gear 12, a drive gear 13 and clutch 14, a drive shaft 18 with sprocket wheels 17, on the other hand.

It is by means of these driving and transmission elements that the sprocket chain 39 is guided, reoriented, adjusted and driven in the treatment zones. A shaft 20 is driven by a drive gear 40, the shaft 20 driving in turn a shaft 28 through chain drives 31, 32, 33 and, thus, the sprocket chain 39 through sprocket wheels 27 with continuous driving motion in the loading and unloading zone.

For discontinuous driving motion, the chain 32 is omitted and the sprocket chain 39 driven through sprocket wheels 27 mounted on shaft 28 and through a motor 21, transmission 22, gear train 23, 24 with lock mechanism 25, 26, mounted therein, the control of the discontinuous motion of the sprocket chain being accomplished by contact discs with contact switches 29, 30, and the dips 35, 36 being held within limits by limit switches 37, 38.

The sprocket wheels 19 on the shaft 20 are free running to permit length compensation for the sprocket chain 39. To shorten the treatment path of the conveyor in a salt bath tank, the sprocket wheels 15, 27 with shafts 16, 28 and all the sprocket wheels 17 and shafts 18 located ahead of the respective salt bath tank are brought to a standstill by actuating the clutch 14, and all sprocket wheels 17 and shafts 18 located behind the salt bath tank are kept moving until the new treatment path in the respective salt bath tank has established itself. The length of sprocket chain pulled out of the salt bath tank is absorbed by the dip 35 of the sprocket chain 39. After the reengagement of the clutches of all shafts 16, 18, the new treatment path is constantly followed.

To lengthen the treatment path, the sprocket wheels 17 with shafts 18 located behind the respective salt bath tank are brought to a standstill by actuating the clutch 14, the sprocket wheels 17 with shafts 18 located ahead of the respective salt bath tank, sprocket wheels 15 and shafts 16, sprocket wheels 27 and shaft 28 continuing to move until the new, longer treatment path has established itself. After the reengagement of all disengaged shafts 18, the new treatment path is likewise followed constantly. The length of sprocket chain additionally extended in the salt bath tank is taken from the dip 35 of the sprocket chain 39. On the other hand, there is also the option of compensating for the change in the treatment path by appropriately actuating the sprocket wheels 27 with shafts 28 which change the dip 36.

What is claimed is:

1. In combination with at least one vessel for containing a liquid substance for surface treating objects of glass or similar materials, a conveyor for transporting the objects through treatment, loading and unloading zones comprising at least one vessel for containing the liquid substance, the conveyor comprising a plurality of sprocket wheels, means for driving said sprocket wheels, sprocket chain means trained over said sprocket wheels and freely hanging therebetween, means for carrying the glass objects so mounted on said sprocket chain means as not to permit the glass objects substantially to change their orientation with a change in the orientation of said sprocket chain means, said sprocket wheels and said sprocket chain means being so arranged that the glass objects are first carried downwardly into the vessel and are then carried upwardly out of the vessel with the opening of any cavity in each of the objects facing downwardly during the upward movement, said driving means including clutch means for engaging and disengaging selected ones of said sprocket wheels for changing the depth of chain dip between selected ones of said sprocket wheels.

2. The combination according to claim 1, wherein said driving means includes means for driving the sprocket chain at a predetermined speed through a treatment zone and further comprising additional sprocket wheels for guiding the sprocket chains through the loading and unloading zones before and after treatment for loading the objects into the carrying means and unloading the objects from the carrying means and means are provided for discontinuously driving the sprocket chain in the loading and unloading zones at a mean speed equal to the speed of the sprocket chain through a treatment zone, to facilitate the loading and unloading of the objects while permitting substantially continuous operation of the entire conveyor.

3. The combination according to claim 2, in which the sprocket chain is of a length to provide between the treatment zone and the loading zone and between the treatment zone and the unloading zone respective reserve dips of sprocket chain to permit said discontinuous driving of the sprocket chain.

* * * * *